May 18, 1926.  1,584,797

J. A. NEAL

RESAWING MACHINE

Filed March 5, 1925  2 Sheets-Sheet 1

Inventor
Joseph A. Neal
By Donald E. Donell
His Attorneys

May 18, 1926.　　　　　　　　　　　　　　　1,584,797
J. A. NEAL
RESAWING MACHINE
Filed March 5, 1925　　　2 Sheets-Sheet 2
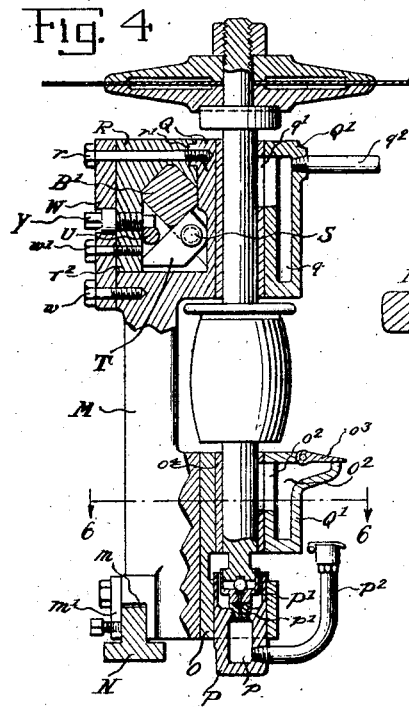
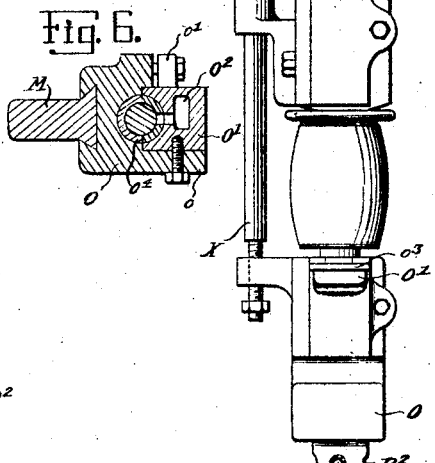
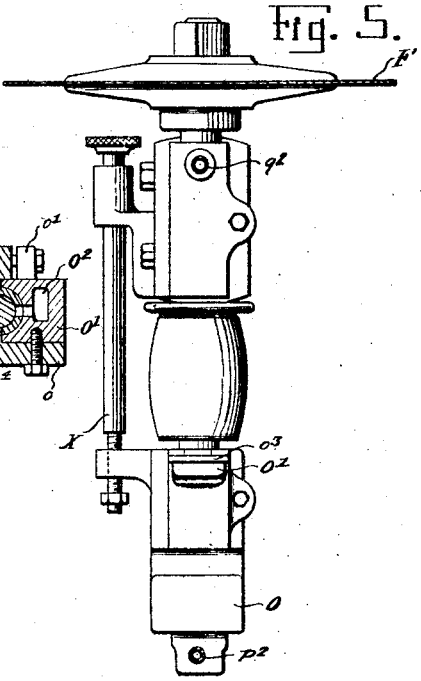
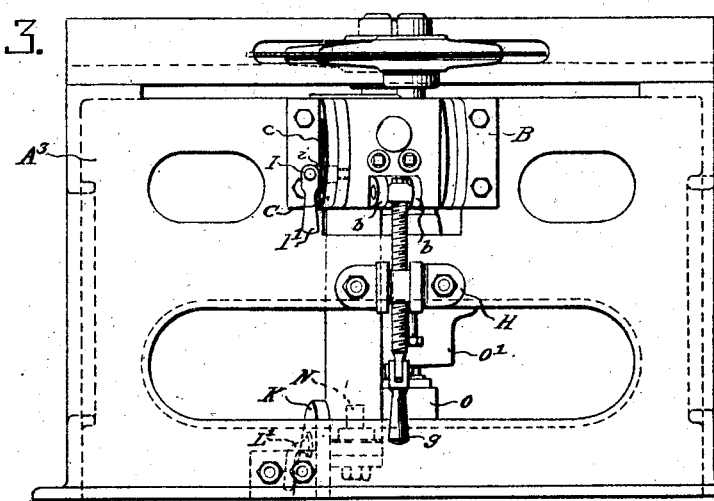
Inventor
Joseph A. Neal
By Dowell & Dowell
Attorneys

Patented May 18, 1926.

1,584,797

UNITED STATES PATENT OFFICE.

JOSEPH A. NEAL, OF MOBILE, ALABAMA, ASSIGNOR OF ONE-HALF TO STOVER LUMBER COMPANY, OF MOBILE, ALABAMA, A CORPORATION OF ALABAMA.

RESAWING MACHINE.

Application filed March 5, 1925. Serial No. 13,292.

This invention relates to sawing machines, and more particularly to machines for resawing lumber as it leaves the planing mill.

The primary object of the invention is to provide a resawing machine having twin circular saws supported upon a tilting frame extending obliquely across the main supporting frame and adapted to be adjusted and secured at any desired angle to a horizontal plane, for changing the angle of the saws, so as to adapt them to cut the stock on a bevel at any desired angle.

A further object is to provide a tilting saw-carrying frame extending obliquely across the main supporting frame and carrying twin circular saws mounted on shafts arranged in a plane parallel with the saw-carrying frame, so as to position the cutting edge of one saw slightly in advance of the cutting edge of the other saw, and means for tilting the saw-carrying frame and securing it at various angles to a horizontal plane, to adapt the saws to cut the stock on a bevel at any desired angle, without changing the position of either saw relatively to the frame on which it is mounted, together with means for adjusting the saws both vertically and laterally and securing them at different distances apart and at different heights for cutting material of different thicknesses and widths.

A further object is to provide a machine of the character referred to with simple, efficient and reliable means for accomplishing the desired angular, vertical and lateral adjustment of the saws in such manner as to prevent or reduce to a minimum the danger of accidental displacement or shifting of the position of the saws when once adjusted and secured in a fixed position.

Another object is to provide, in a machine of the character referred to, simple and efficient means for varying the angle of the two saws simultaneously and of either saw independently of the other at an angle to a line passing horizontally through the machine between the two saws.

The invention will first be hereinafter more particularly described, with reference to the accompanying drawings, which are to be taken as a part of this specification, and then pointed out in the claims at the end of the description.

In said drawings,

Fig. 3 is a side elevation, showing the means employed for adjusting and securing the tilting saw-carrying frame in different positions to change the angle of the saws relative to a horizontal plane;

Fig. 4 is a vertical sectional elevation of one of the mandrel-supporting frames with associated shaft bearings and means for adjusting the same laterally and securing it in different positions with the saws at different distances apart;

Fig. 5 is a side elevation of the structure shown in Fig. 4;

Fig. 6 is a detail sectional view taken on the line 6—6 of Fig. 4; and

Fig. 7 is a detail sectional view taken on the line 7—7 of Fig. 2.

Figure 1:
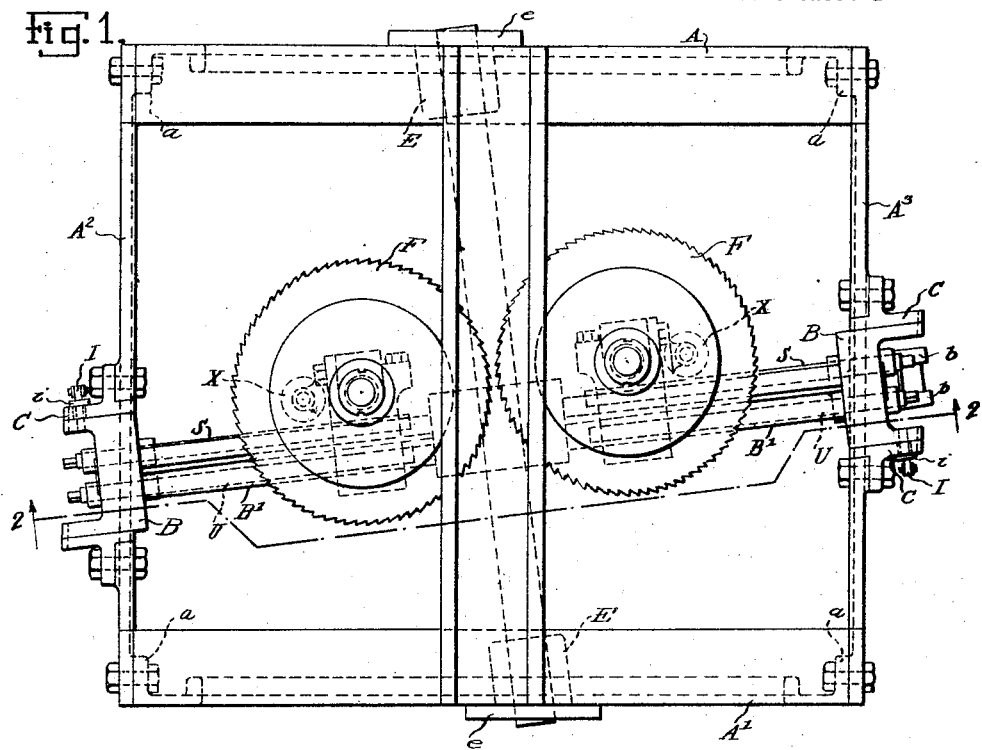
Fig. 1 is a plan view of a resawing machine embodying my invention.

The machine shown in the present case is an embodiment of a specific construction or modification of the generic invention illustrated and described in another application of even date herewith, Serial No. 13,291 in which I have shown certain features, including a separating device and a hold-down device and other elements designed to be used in connection with or forming a part of the complete machine or usual equipment of the machine shown in the present case, such features not being shown in the drawings in the present case, as they form no part of my present invention.

Referring to said drawings, in which the same reference characters are used to denote corresponding parts in different views, the main supporting frame is preferably constructed of metal, in the form shown, but it may be made of wood, or of wood and metal, and of any suitable construction. As shown, it comprises four vertical sides secured together in box-like form at the four corners thereof by fastening bolts passing through holes in marginal flanges $a$ at opposite ends of the front and rear sides A and $A^1$, and through registering holes in opposite ends of the other two sides or ends $A^2$ and $A^3$. A cut-away portion or gap is provided in each of the two sides or ends $A^2$ and $A^3$ to receive vertically slidable blocks or heads B secured to or formed integrally with the upper frame bar $B^1$ of an auxiliary frame which carries the saws, said frame bar serving as a support and guide for lateral adjustment of mandrel supporting frames. Said auxiliary frame is composed of said upper support and guide bar and a lower horizontal bar $B^2$, the bars $B^1$ and $B^2$ being connected at opposite ends thereof by depending slightly inwardly inclined legs $B^3$. Mandrel supporting frames carrying twin circular saws are secured to said upper and lower horizontal bars with provision for lateral, vertical and angular adjustment of the saws as hereinafter described. The auxiliary frame extends obliquely across the main supporting frame from side to side or end to end thereof and the heads or blocks B on the upper horizontal frame bar or support and guide for the mandrel-supporting frames are placed between vertical guide brackets C bolted or otherwise secured to the adjacent ends of the cut-away portions of the side bars of the frame in which said vertical recesses or gaps are formed for the sliding heads or blocks B; the confronting faces of said guides or brackets C being arranged at an obtuse angle to the sides or ends of the main frame to which they are secured. Between each pair of guides or brackets C is fitted one of the heads or blocks B on opposite ends of the auxiliary frame bar $B^1$. These sliding heads or blocks are adapted to move vertically in the arc of a circle along the guideways therefor. The auxiliary frame is supported about midway thereof on a horizontal beam or shaft D which passes through a hole in an enlargement of the upper frame bar $B^1$, about midway thereof, and extends obliquely across the machine frame from front to rear thereof substantially at right angles to the auxiliary frame, and is preferably round or has round ends to provide trunnions which are revolubly fitted in bearing members E of tubular form secured to the front and rear frame bars or sides of the main supporting frame so as to permit the auxiliary frame to be tilted; said auxiliary frame having secured thereto laterally adjustable mandrel supporting frames with attached bearings for vertical shafts on which are mounted circular saws F. Said bearing members E have end flanges $e$ arranged at an angle thereto and suitably apertured to receive fastening bolts or screws for securing them to said front and rear frame bars so as to provide obliquely arranged bearings for the ends of said shaft D. By this arrangement one of the saws is positioned slightly in advance of the other and their supporting frame is adapted to be tilted or caused to swing about the shaft D as a center and to be secured in different positions to change the angle of the saws so as to adapt them to cut the stock on a bevel. For the purpose of adjusting and securing the tilting frame in different positions, a vertical adjusting screw G at one side of the main supporting frame is pivotally connected or swiveled to a pivot-pin placed between lugs $b$ projecting from the sliding block or head B at one end of the auxiliary frame and having reduced end portions or pintles fitted in apertures in said lugs; said screw extending downwardly through a threaded aperture in a similar pivot-pin fitted between apertured lugs projecting from a supporting bracket H fixed on the machine frame, said pivot-pin having reduced ends fitted in holes through said lugs so that when the adjusting screw is rotated to raise or lower the end of the tilting frame the screw as it travels up and down through the aperture in its pivotal support may shift from a true vertical position to an inclined position. The screw G is provided with means for rotating it so as to move the sliding block to which it is attached up or down, for the purpose of tilting the auxiliary frame to change the angle of the saws; such means consisting of a lever or handle $g$ pivoted to the lower end of the screw and adapted to be swung into a horizontal position at right angles to the screw so as to serve as a lever for rotating it. The tilting frame may be locked in any desired position after adjustment, to change the angle of the saws, by means of a locking device provided at each end thereof and which may consist of a threaded bolt or pin I inserted through an arcuate slot $c$ in an adjacent guide-bracket C and screwed into a threaded hole in the adjacent guide-block or head B; said threaded bolt or pin having an enlarged head or flange $i$ intermediate its ends adapted to press against the outer side of said guide bracket, so that when the screw is turned its enlarged head portion or flange $i$ will be forced tightly against the bracket, causing the sliding block to be drawn into binding frictional contact with the bracket, thereby locking and rigidly securing the tilting frame in a fixed position relatively to the main supporting frame with the saws arranged at any desired angle to a horizontal plane. The locking bolt or pin $i$ has pivoted thereto one end of an operating lever $i^1$ by which it may be rotated to loosen or tighten the screws.

To hold the lower portion of the tilting frame in different positions after adjustment while permitting it to be tilted for the purpose of changing the angle of the saws, brackets K are secured to lower frame-bars of the main supporting frame, one at each end of the tilting frame, and suitable clamping devices similar to the one hereinbefore described may be used for securing the lower ends of the tilting frame to said brackets. As shown, said brackets have arcuate slots $k$ formed therein, through each of which is inserted a screw L, which protrudes into a threaded hole or socket in the lower frame-bar of the tilting frame, for securing the two parts together with provision for adjustment by simply loosening the clamping devices by which the lower portion of the tilting frame is secured to the main supporting frame and turning the adjusting screw G sufficiently to accomplish the desired adjustment. The enlarged head or collar on the screw L bears tightly against the outer side of the bracket to which it is secured, so that when rotated in one direction it will draw the sliding block into binding frictional contact with the guide-bracket and firmly secure the two parts together. For turning the screw it has secured to its outer end or formed integrally therewith an operating handle $L^1$. The shaft D is concentric with a circle described by the arcuate slots in the brackets K, so that the clamping devices L may travel along said slots to permit the saw-carrying frame to be tilted or rocked upon said shaft as a center, for the purpose of raising or lowering one end and simultaneously lowering or raising the other end so as to change the angle of the saws. Mandrel-supporting frames are carried by the tilting frame, one at each side of the shaft D. These frames may be of any suitable construction, such, for example, as shown and described in my U. S. Patent No. 1,340,286, dated May 18, 1920, having means associated therewith for lateral or sidewise adjustment and also vertical adjustment of the saws; but I preferably employ mandrel-supporting frames of the form shown, each having associated therewith vertical shaft bearings and means for lateral, vertical and angular adjustment of the saws independently of the angular adjustment provided by the tilting frame. As shown, there is an upright bar or frame-member M connecting the upper and lower horizontal frame-bars $B^1$ and $B^2$ of the tilting frame, one at each side of the central support or shaft D, and carrying or having attached thereto suitable bearings for the vertical shafts on which the saws are mounted. Inasmuch as the mandrel-supporting frame and associated parts at one side of said central support or shaft D are duplicates of those on the other side, a description of one will suffice for a description of both. The uprights M are each laterally slidably supported at its upper end on the upper frame-bar $B^1$ of the tilting frame while the lower end thereof is laterally slidably supported upon a shoe N mounted on the lower cross-bar $B^2$ of said tilting frame. The shoes N rest upon said lower cross-bar between apertured lugs or flanges rising therefrom, in which set screws $n$ are inserted, between which the base of the shoe is fitted, the shoe being in cross-section of T-shaped form inverted so that a very nice adjustment is permitted for securing and holding the lower end of the mandrel-supporting frame in proper position. The lower end of the vertical bar M has a recess $m$ therein to adapt it to fit slidably upon the shoe and a plate $m^1$ bolted thereto beside the recess, thus forming an open-ended slot to receive or fit over the shoe; said plate carrying a set screw which impinges against the shoe and holds the lower end of the mandrel-supporting frame or bar M in a fixed position while permitting adjustment thereof along the length of the shoe. Said bar M is formed or provided with a dove-tailed or tongue and groove connection with one member O of the lower vertical shaft bearing, said member being formed with a substantially semi-circular recess on the opposite side thereof confronting or facing a correspondingly shaped recess in a bearing member $O^1$ secured to the member O by fastening bolts or screws, in this instance by means of a set screw inserted in a lug or flange $o$ projecting rearwardly from one side of the bearing member O and screwed into a threaded hole or socket in the bearing member $O^1$, the latter having an apertured lug $o^1$ on the opposite side thereof through which a set screw is inserted and screwed into a threaded socket or hole in the bearing member O, for securing the two members together. Said lower bearing member $O^1$ or the upper part thereof, is hollow to provide an oil chamber $O^2$ which communicates through a vertical slot $o^2$ in the inner wall thereof with the interior of the shaft bearing formed by the opposed recesses in the two bearing members O and $O^1$, for lubricating the lower vertical shaft bearing; the outer wall of said hollow portion being turned outwardly at its upper end and projecting sufficiently to provide an open top having a hinged cover $o^3$ for introducing oil or other lubricant. Fitting around the vertical shaft between the opposed recesses in the bearing members O and $O^1$, is a sleeve $o^4$ having a vertical oblong slot therein beside the vertical slot $o^2$ in said hollow portion, through which oil or other lubricant may pass to the shaft bearings. The lower end portions of the two bearing members O and $O^1$ provide a housing in which is fitted a step bearing for the vertical shaft or mandrel which supports the circular saw. Said step bearing comprises a lower member P, having an oil reservoir $p$ in the lower part thereof and a socket in its upper end, and an upper member $P^1$, of cup-like form secured in said socket by means of a threaded boss or projection $p^1$ on its lower end, which is screwed into the bottom of the socket in the lower member.

Figure 2:
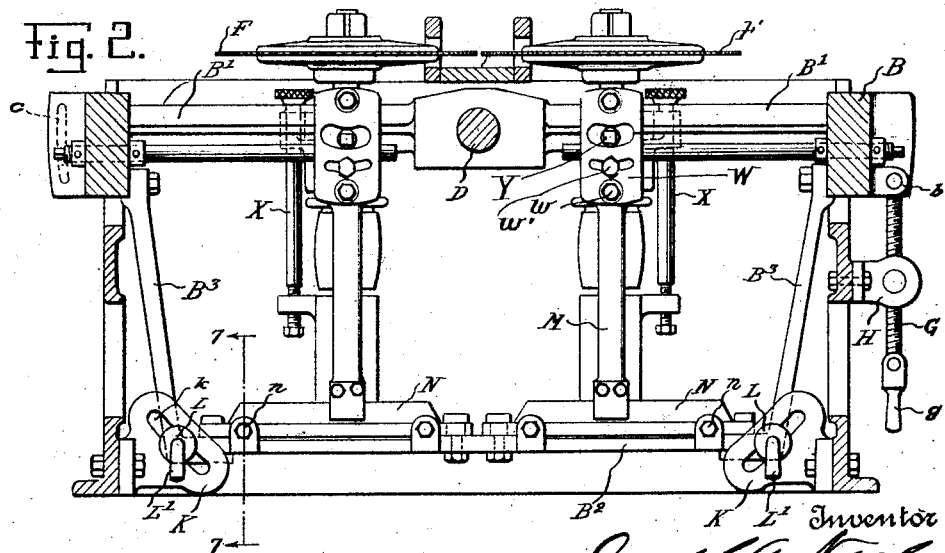
Fig. 2 is a vertical sectional elevation of the same, taken on the line 2—2 of Fig. 1.

In the cup of the upper member is placed an anti-friction device or ball on which the lower end of the vertical shaft or mandrel rests. Said boss or projection $p^1$ has formed therein a minute vertical orifice or channel leading from the oil cup in the lower member P, for the passage of oil or other lubricant upwardly into the cup of the upper step bearing member, and for supplying oil to said reservoir it is provided with a feed pipe $p^2$ which extends upwardly above the level of the oil in said reservoir so that the lubricant will find its level within the step bearing and effectually lubricate the lower shaft bearing. The upper shaft bearing comprises separable parts Q and $Q^1$, which are formed or provided with opposed concave or semi-circular recesses therein and are secured together by fastening means substantially the same as those described with reference to the lower bearing members. The bearing member Q is fixed and preferably formed as an integral offset upward extension of the mandrel support M, though it may be bolted or otherwise secured to said support. The bearing member or casting $Q^1$ is hollow so as to provide an oil chamber $q$ therein and the inner wall of said chamber has an oblong vertical slot $q^1$ therein beside a similar slot in the sleeve which surrounds the vertical shaft between the bearing surfaces of the two bearing members, as described with reference to the lower bearing members, to afford communication with said bearing surfaces, for the purpose of lubricating the upper shaft bearing; said oil chamber having attached thereto a feed pipe $q^2$, through which oil or other lubricant is introduced. To the aforesaid extension of the mandrel support or the bearing member Q is secured the head portion of a sliding block R and cover plate W, by means of a fastening bolt $r$ passing through said cover-plate and sliding block and screwed into a boss $r^1$ on said extension; said block being in the form of the letter L inverted and having a depending limb $r^2$ which rests on the top of the support M, at the base of said extension, thus providing a recess or opening between said extension and the depending limb of said block through which passes the tilting frame bar $B^1$, an adjusting screw S, and a locking bolt or rod U, whereby the mandrel-supporting frame and the upper bearing members of the vertical saw-carrying shaft are adapted to be moved along said frame-bar for the purpose of adjusting and securing the saws at different distances apart. The frame-bar or beam $B^1$ is preferably square in cross-section and arranged with its flat sides at an angle to a vertical plane so that the upper angular portion thereof underlies and fits within a V-shaped or triangular recess in the underside of the head portion of said sliding block so as to support and adapt the block to move laterally thereon. The outer side of the depending limb of the sliding block is flush with the outer side of the head portion of the upright M at the base of its offset extension and said upright has a threaded aperture or hole therein to receive a fastening bolt or set screw $w$ for securing thereto the lower end of the cover-plate W which carries a locking device or pin Y adapted to engage the locking bolt or rod U and hold the sliding block in a fixed position after adjustment or movement along the frame-bar $B^1$ by rotation of the screw S as hereinafter described. The cover-plate W is secured to the block R by means of a set screw $w^1$ which is inserted through an arcuate slot in the cover-plate and screwed into a threaded hole in the depending limb of said block, and the locking pin Y is also inserted through an arcuate slot in the plate W, so that a slight lateral swinging movement of the mandrel-supporting frame about the pivot bolt $r$ is permitted, whereby the lower end thereof may be adjusted laterally and secured in different positions along the frame-bar $B^2$ to change the angle of the saw independently of the angular adjustment provided by the tilting frame. The adjusting screw S and locking bolt U are arranged underneath the frame-bar $B^1$ in parallel relation thereto and to each other and have their outer ends revolubly mounted in one of the heads B of the tilting frame and are secured thereto against endwise movement by means of fixed nuts on opposite sides of said head as shown in Figs. 1 and 2. The outer free ends of the adjusting screw S and locking bolt U are of polygonal form for attaching thereto a wrench or other device for turning the same. The screw S passes through a threaded aperture in a travelling plate or device T housed within the recess between the extension of the mandrel support and the depending limb of the sliding block R and abutting against a flat side of the bar $B^1$ so as to prevent rotary movement of said plate T when the screw is turned so as to move the upper end of the mandrel-supporting frame and associated shaft bearing laterally by applying to the outer end of the screw a wrench or other means for imparting rotary movement thereto. By these means the upper end of the mandrel-supporting frame and the upper shaft bearing may be moved back and forth and secured in different positions for varying the distance between the cutting edges of the saws. The locking bolt or rod U is flattened on one side to provide sufficient clearance between it and the locking pin Y, when its flat side faces said pin, to release the locking bolt and permit the adjusting screw to be turned to move the sliding block laterally to effect lateral adjustment of the saws. After such adjustment the locking bolt is turned so that its round surface will engage the locking pin and hold the upper end of the mandrel-supporting frame and the shaft bearing associated therewith in a fixed position. To raise and lower the mandrels and adapt the saws to cut thick or thin boards, as desired, adjusting means such as shown in my aforesaid Patent No. 1,340,286 may be employed, consisting of a vertical rod or bolt X rotatably fitted in apertured lugs projecting laterally from the mandrel frame or shaft bearing members carried thereby; the lower end of the rod being threaded and screwed into a threaded aperture in a lug projecting from the lower bearing member O having the tongue and groove connection with the mandrel support or upright M, to permit vertical adjustment thereof, whereby the vertical shaft may be raised or lowered to raise or lower the saw. The upper end of the rod X is provided with a suitable handle or milled wheel thereon for turning the rod to accomplish the desired adjustment.

Having thus described my invention, what I claim as new and desire to secure by Letters Patent of the United States is:

1. In a sawing machine, a main supporting frame having mounted thereon an auxiliary frame pivotally supported intermediate its ends and extending obliquely across said main frame and carrying twin circular saws, the mandrels on which said saws are mounted being arranged so that one saw is positioned slightly in advance of the other saw, and means for tilting said auxiliary frame and securing it in different positions, so as to change the angle of the saws and adapt them to cut the stock on a bevel or at an oblique angle.

2. In combination, a main supporting frame having a rock-shaft thereon extending obliquely from front to rear thereof, an auxiliary frame extending obliquely across said main frame substantially at right angles to and supported on said rock-shaft, and twin circular saws carried by said auxiliary frame, said main frame having guideways on opposite sides thereof, one arranged slightly in advance of the other, and guide blocks on opposite ends of said auxiliary frame adapted to travel along said guideways in the arc of a circle concentric with said rock-shaft, whereby the auxiliary frame may be tilted so as to adapt the saws to cut the stock on a bevel or at an oblique angle, together with means for adjusting and securing said auxiliary frame in different positions.

3. The combination, in a resawing machine, of a main supporting frame having guideways thereon on opposite sides thereof, one of said guideways being arranged slightly in advance of the other, a shaft extending obliquely across said main frame from front to rear, and an auxiliary frame secured to said shaft substantially at right angles thereto, said auxiliary frame carrying twin circular saws, one saw having its cutting edge arranged slightly in advance of the cutting edge of the other, guide-blocks at opposite ends of said auxiliary frame movable vertically along said guideways, and means for tilting and securing said auxiliary frame in different positions, thereby changing the angle of the saws to adapt them to cut the stock on a bevel or at an oblique angle.

4. The combination, in a resawing machine, of a main supporting frame having vertical guideways thereon on opposite sides thereof, one of which is arranged slightly in advance of the other, a shaft extending obliquely across said frame, an auxiliary frame extending obliquely across said main frame substantially at right angles to said shaft and having guide-blocks on opposite ends thereof slidably fitted in said guideways, said auxiliary frame carrying mandrel supporting frames and twin circular saws mounted on vertical shafts arranged substantially parallel with said auxiliary frame, one slightly in advance of the other, and means for tilting said auxiliary frame on said shaft as a center, thereby tilting the saws to adapt them to cut the stock on a bevel or at an oblique angle.

5. The combination, in a resawing machine, of a main supporting frame having vertically disposed guideways on opposite sides thereof arranged at an angle to the sides of said frame, a rock-shaft extending obliquely across said frame from front to rear, bearings for said shaft arranged at an angle to the sides of said frame, one of said bearings being placed slightly in advance of the other, an auxiliary frame mounted on said rock-shaft substantially at right angles thereto and extending obliquely across said main frame from side to side thereof and having guide-blocks on opposite ends slidably fitted in said guideways; said auxiliary frame carrying mandrel supporting frames and a pair of circular saws, and means for tilting said auxiliary frame, so as to change the angle of the saws, together with means for securing it in different positions.

6. In combination with a main supporting frame having guideways thereon on opposite sides thereof, a tilting frame supported on a shaft journaled in bearings on opposite sides of said main frame, said tilting frame having vertical shafts thereon carrying twin circular saws, guide-blocks on opposite ends of said tilting frame movable vertically in the arc of a circle concentric with said shaft, and means for tilting and securing said tilting frame in different positions to change the angle of the saws; said means comprising an adjusting screw having one end pivoted to one of said guide-blocks and depending therefrom through a threaded aperture in a rocking support therefor fixed on said main frame and provided with a handle on its free end for imparting rotary movement thereto.

7. In combination with a main supporting frame, a tilting frame extending obliquely across said main frame and having vertical shafts journaled thereon, each shaft carrying a circular saw, a rock-shaft on which said tilting frame is mounted so as to adapt it to be tilted to change the angle of the saws, said main frame having on opposite sides thereof opposed guides between which guide-blocks carried by said tilting frame are slidably fitted, said guide-blocks being movable vertically in the arc of a circle concentric with said shaft, and means for tilting and securing said tilting frame in different positions to change the angle of the saws, said means comprising a screw having one end pivoted to one of said guide-blocks and depending therefrom through a threaded aperture in a rocking support therefor secured to said main frame so as to adapt the screw in its lengthwise movement to change from a true vertical to an inclined position, and means for turning said screw.

8. In combination with a main supporting frame, a tilting frame extending obliquely across said main frame and carrying a pair of circular saws mounted on vertically and laterally adjustable shafts, said tilting frame being mounted on said main frame so as to adapt it to rock upon a central support extending substantially at right angles thereto, said main frame having on opposite sides thereof opposed guides between which guide-blocks carried by said tilting frame are slidably fitted, said guide-blocks being movable vertically in the arc of a circle concentric with said central support, and means for tilting said tilting frame to change the angle of the saws, said means comprising a screw having one end pivoted to one of said guide-blocks and depending therefrom through a threaded aperture in a support therefor pivotally secured to said main frame, means for turning said screw, and means for clamping the guide-block to which said screw is pivoted in a fixed position on said main frame.

9. In combination with a main supporting frame, a tilting frame extending obliquely across said main frame, a rock-shaft journaled on said main frame upon which said tilting frame is mounted intermediate its ends, said main frame having secured thereto on opposite sides thereof opposed guides between which guide-blocks on the ends of said tilting frame are slidably fitted, said guide-blocks being movable vertically in the arc of a circle concentric with said rock-shaft, and means for tilting said tilting frame to change the angle of the saws, said means comprising a screw having one end pivoted to one of said guide-blocks and depending therefrom through a threaded aperture in a support therefor pivotally supported on said main frame so as to adapt the screw in moving lengthwise to change from a true vertical to an inclined position, said tilting frame having a lower horizontal frame bar and associated means for securing it in different positions parallel with an upper frame bar secured to said rock-shaft.

10. In combination with a main supporting frame, a tilting frame extending obliquely across said main frame, a rock-shaft extending obliquely across said main frame substantially at right angles to said tilting frame, the tilting frame being supported intermediate its ends on said rock-shaft, and having upper and lower frame bars supporting bearings in which are journaled vertical shafts each carrying a circular saw, said main frame having secured thereto on opposite sides thereof opposed guides between which guide-blocks on the ends of said tilting frame are slidably fitted, said guide-blocks being movable vertically in the arc of a circle concentric with said rock-shaft, means for tilting said tilting frame to change the angle of the saws, and means for securing said tilting frame in different positions, together with means for securing said lower frame bar in different positions, the latter means comprising brackets fixed on the lower ends of said main frame and having arcuate slots therein concentric with said rock-shaft, and clamp-screws carried by said lower frame bar engaging said arcuate slots whereby the latter frame bar may be secured in binding contact with said brackets.

11. The combination, in a resawing machine, of a main supporting frame, a rock-shaft extending obliquely across said frame, a tilting frame supported on said rock-shaft substantially at right angles thereto, twin circular saws mounted on vertical shafts carried by said tilting frame, guideways on opposite sides of said main frame, guide-blocks on the ends of said tilting frame slidable vertically in said guideways in the arc of a circle concentric with said shaft, and means for tilting said auxiliary frame to change the angle of the saws, together with means for securing the lower part of said tilting frame in different positions, the latter means comprising angular brackets fixed on one of said frames and clamp-screws carried by the other frame, whereby the lower ends of the tilting frame are held in binding contact with said brackets, the latter having arcuate slots therein through which said clamp-screws pass.

12. The combination, in a resawing machine, of a main supporting frame, a saw-carrying frame extending obliquely across and pivotally supported intermediate its ends on said main frame, its pivotal support being arranged between mandrel supporting frames carrying twin circular saws, means for tilting said saw-carrying frame to change the angle of the saws, and means for securing it at various angles to a horizontal plane so as to adapt the saws to cut the stock on a bevel or at an oblique angle, together with means for adjusting the saws and securing them at different distances apart and at different heights.

13. In a sawing machine, a main supporting frame having parallel guide-bars thereon between which the material to be treated is moved into position for the action of the saws, a tilting frame supported intermediate its ends on a rock-shaft extending across said main frame at an angle to said guide-bars; said tilting frame having its ends vertically slidably fitted in vertical guide-ways on opposite sides of said main frame and also having twin circular saws mounted thereon, one at each side of said rock-shaft, and said saws having their cutting edges protruding through oblong slots in said guide-bars, means for adjusting and securing said tilting frame in different positions, so as to change the angle of the saws to a horizontal plane, and means for changing the angle of the saws independently of the angular adjustment provided by said tilting frame, together with means for adjusting and securing said saws at different distances apart.

14. In a sawing machine, a main supporting frame having parallel guide-bars thereon between which the material to be treated is moved into position for the action of the saws, a tilting frame supported intermediate its ends on a rock-shaft extending across said main frame at an angle to said guide-bars; said tilting frame having its ends vertically slidably fitted in vertical guide-ways on opposite sides of said main frame and also having twin circular saws mounted thereon, one at each side of said rock-shaft, and said saws having their cutting edges protruding through oblong slots in said guide-bars, means for adjusting and securing said tilting frame in different positions, so as to change the angle of the saws to a horizontal plane, and means for changing the angle of the saws each independently of the other and of the angular adjustment provided by said tilting frame, together with means for adjusting and securing said saws at different distances apart and at different heights.

15. The combination, in a resawing machine, of a main supporting frame, a saw-carrying frame extending obliquely across and pivotally supported intermediate its ends on said main frame, its pivotal support being arranged between mandrel-supporting frames carrying twin circular saws, means for tilting said saw-carrying frame to change the angle of the saws, and means for securing it at various angles to a horizontal plane so as to adapt the saws to cut the stock on a bevel or at an oblique angle.

16. In a resawing machine, a pair of mandrel-supporting frames each carrying vertical shaft bearings and a circular saw mounted on a shaft journaled in said bearings, and means for adjusting and securing either mandrel-frame independently of the other in a slightly inclined position so as to change the angle of the saw relative to a horizontal plane, the lower bearing being vertically adjustable to change the height of the saw, and both mandrel-frames being laterally adjustable for varying the distance between the saws.

In testimony whereof I affix my signature.

JOSEPH A. NEAL.